(12) United States Patent
Smyth et al.

(10) Patent No.: US 7,805,432 B2
(45) Date of Patent: Sep. 28, 2010

(54) META SEARCH ENGINE

(75) Inventors: Barry Smyth, County Wicklow (IE); Oisín Boydell, County Wicklow (IE)

(73) Assignee: University College Dublin National University of Ireland, Dublin, Dublin (IE)

( * ) Notice: Subject to any disclaimer, the term of this patent is extended or adjusted under 35 U.S.C. 154(b) by 411 days.

(21) Appl. No.: 11/812,151

(22) Filed: Jun. 15, 2007

(65) Prior Publication Data

US 2008/0281810 A1    Nov. 13, 2008

(30) Foreign Application Priority Data

Jun. 15, 2006 (IE) .................................. 2006/0455

(51) Int. Cl.
*G06F 17/30* (2006.01)
(52) U.S. Cl. ................ 707/711; 707/706; 707/999.001; 707/999.002; 707/999.101; 707/999.102
(58) Field of Classification Search ...................... 707/1, 707/5, 101, 102, 711
See application file for complete search history.

(56) References Cited

U.S. PATENT DOCUMENTS 6,546,385 B1 * 4/2003 Mao et al. ...................... 707/3
2007/0106660 A1 * 5/2007 Stern et al. ...................... 707/5
2007/0192293 A1 * 8/2007 Swen ............................. 707/3

FOREIGN PATENT DOCUMENTS

WO    2005/008526    1/2005

* cited by examiner

*Primary Examiner*—Apu M Mofiz
*Assistant Examiner*—Monica M Pyo
(74) *Attorney, Agent, or Firm*—Jacobson Holman PLLC

(57) ABSTRACT

In an information retrieval method a meta search engine receives a user information query in the form of key words; and submits the query to a search engine, and also submits the query to a snippet database storing previously selected results, indexed by a snippet index of terms included in snippets of the results when they were previously selected. The meta search engine then receives results from the search engine; and receives a response from the snippet database. It merges the results from the search engine with those from the snippet database; and submits re-ranked results to the user. The snippet database processes in parallel with the underlying search engine. The meta search engine also monitors which results of the returned re-ranked results are selected by the user, and updates the snippet index accordingly.

13 Claims, 3 Drawing Sheets

META SEARCH ENGINE

INTRODUCTION

1. Field of the Invention

The invention relates to a meta search engine for processing results returned by search engines in response to queries submitted by users.

2. Prior Art Discussion

WO2005/008526 describes a meta search engine which adapts and combines results ($R_1$-$R_n$) from search engines ($S_1$-$S_n$) to provide a result set $R^1$. The meta search engine uses at least one "hit matrix" H which is populated with values for "hits" of queries $q_1$-$q_m$ with web pages $p_1$-$p_n$. The historical hit data is used by the meta search engine to re-rank the search results. The hit matrix may be dynamically selected according to a user community.

The invention is directed towards providing a meta search engine with enhanced performance.

SUMMARY OF THE INVENTION

According to the invention, there is provided an information retrieval method carried out by an information retrieval system comprising a meta search engine and at least one underlying search engine, the method comprising the steps of:
  the meta search engine receiving a user information query in the form of key terms;
  the meta search engine submitting the query to each search engine;
  wherein the meta search engine comprises a snippet engine comprising a database storing previously selected results and an index to the database, the index having terms included in snippets of the results when they were previously selected; and wherein the user information query is submitted to the snippet engine;
  the snippet engine retrieving results according to matching of the query terms with the snippet index;
  the meta search engine receiving results from each search engine; and
  the meta search engine merging the search engine results with the snippet engine results to provide output user results, and submitting the output user results to the user.

In one embodiment, the query is submitted to the snippet engine so that the snippet engine processes in parallel with the underlying search engine.

In one embodiment, the method comprises the further steps of the system monitoring which results of the returned output user results are selected by the user, and updating the snippet database and index accordingly.

In one embodiment, a selected result is indexed in the snippet index on the terms in the snippet returned by the search engine.

In one embodiment, repeat terms in a snippet are weighted as they are used to modify the snippet index.

In one embodiment, commonly occurring stop terms of a snippet are not used for the snippet index.

In one embodiment, the snippet engine returns only results having a score greater than a threshold, the score indicating overlap of the query with snippet index terms.

In another embodiment, the snippet engine ranks its results according to similarity of the query terms and the index terms.

In one embodiment, the ranking is according to weighted term vectors.

In one embodiment, the snippet engine assigns to each of its results the snippet from the set of snippets for which the result was previously selected whose associated query is most similar to the current query.

In one embodiment, there are a plurality of snippet indexes, and a particular snippet index is dynamically selected.

In one embodiment, a snippet index is chosen according to a community for the user.

In one embodiment, the snippet index is an inverted document index.

In one embodiment, the method comprises the further step of the snippet engine returning the results with a social summary derived from the snippets of the returned results.

In one embodiment, the meta search engine submits the user information query to a plurality of search engines and merges results from the search engines and then merges the search engine merged results with the snippet engine results.

In another aspect, the invention provides a meta search engine comprising:
  means for receiving a user information query in the form of key terms;
  means for submitting the query to at lest one search engine;
  a snippet engine comprising a database storing previously selected results and an index to the database, the index having terms included in snippets of the results when they were previously selected;
  means for submitting the query to the snippet engine;
  the snippet engine being adapted to retrieve results according to matching of the query terms with the snippet index;
  means for receiving results from each search engine; and
  means for merging the search engine results with the snippet engine results to provide output user results, and for submitting the output user results to the user.

In a further aspect, the invention provides a computer readable medium comprising software code for implementing any method defined above when executing on a digital computer.

DETAILED DESCRIPTION OF THE INVENTION

Brief Description of the Drawings

The invention will be more clearly understood from the following description of some embodiments thereof, given by way of example only with reference to the accompanying drawings in which:
FIG. 1 is a block diagram illustrating a meta search engine and the systems it interfaces with.

DESCRIPTION OF THE EMBODIMENTS

Figure 1:
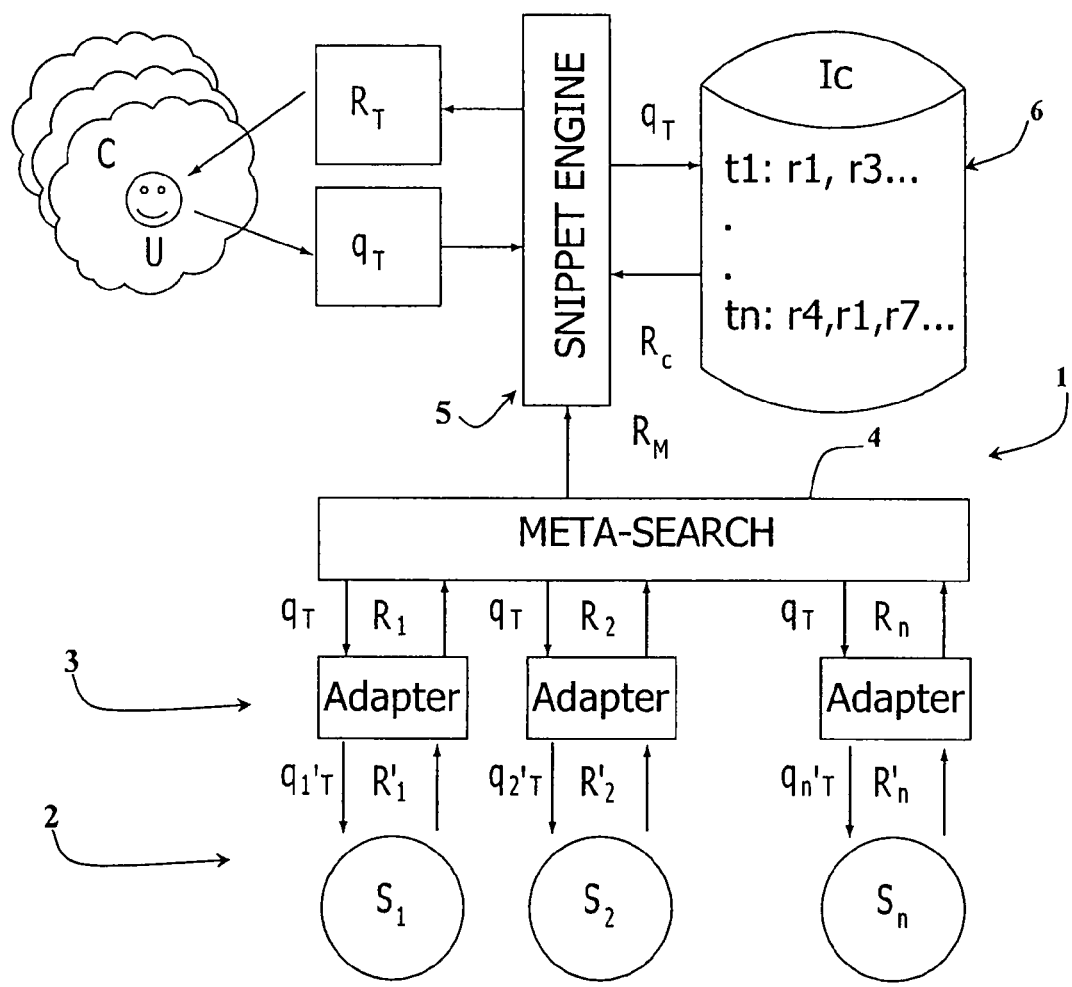

Referring to FIG. 1 a meta search engine 1 communicates with underlying search engines 2 (S1-Sn) via adapters 3. The meta search engine 1 comprises a meta search component 4 and a snippet engine 5 linked with a snippet database 6.

The meta search engine component 4 receives user queries, submits corresponding queries to the search engines 2, receives their results, merges them, and returns the merged results to the snippet engine 5. The snippet engine 5 post-processes these results according to a response from the snippet database 6.

The snippet database 6 contains previously selected results. These results are indexed with terms derived from the snippet of each result. A snippet is the query-biased summary of a result document that is commonly returned by Web search engines, and contains extracts from the content of a result document which are related to the term(s) in the search query that produced the result.

When a result is selected by a user, the result is stored in the snippet database 6 and is indexed under the terms contained in the snippet returned for the current search. If the snippet database already contains the selected result, then the index is updated by adding the terms in the snippet returned for the selected result in the current search There are multiple snippet indexes to the database 6, each indexing previous result selections for an individual user or a community of users. In this case the specific snippet index to be updated with result selections by a particular user is selected dynamically by the meta search engine 1.

Figure 2:
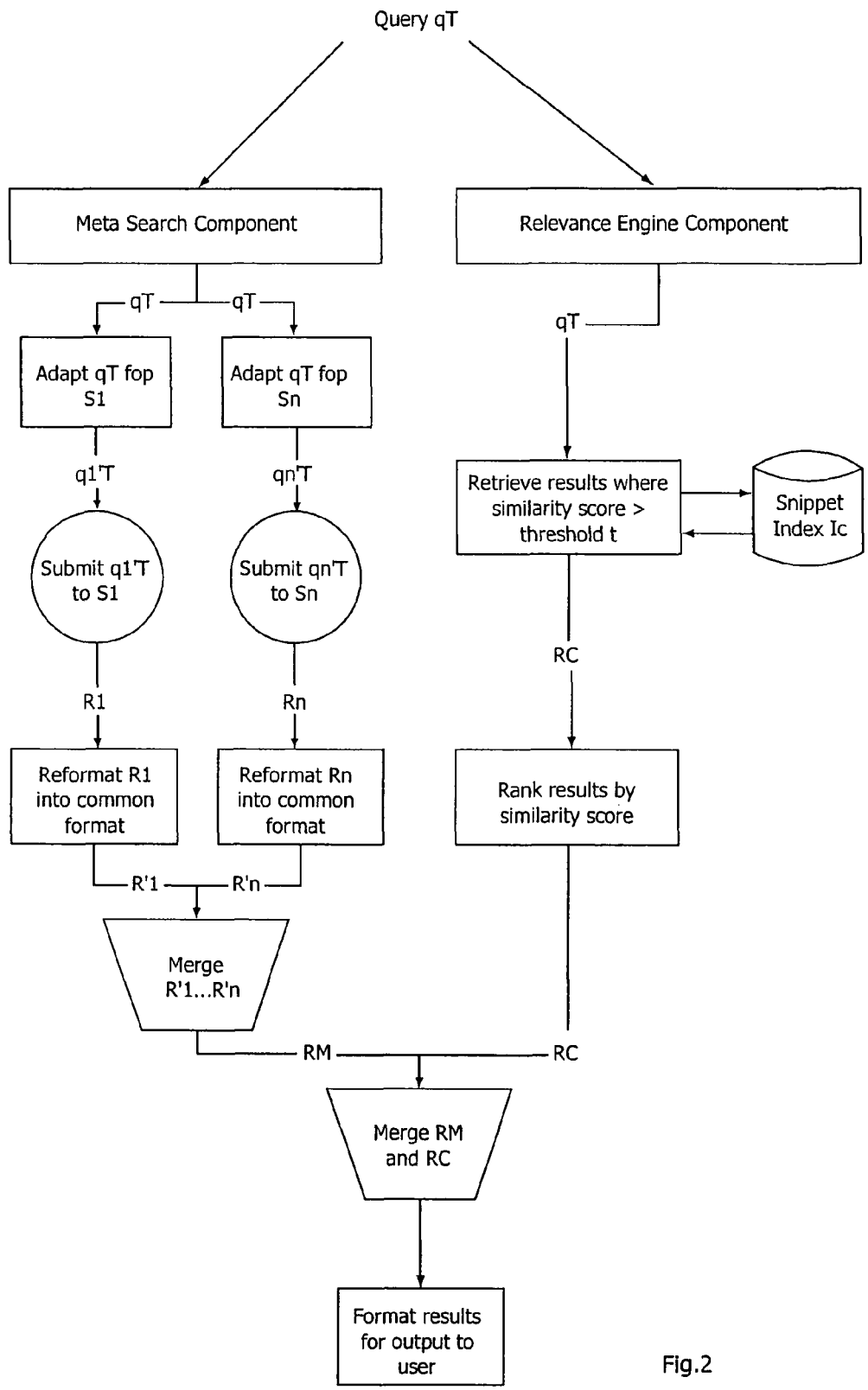
FIG. 2 is a flow diagram illustrating operation of the meta search engine for handling a fresh query $q_T$.

Referring to FIG. 2, when a new search query is submitted to the meta search engine 1, the query is submitted to the underlying search engines 2. In parallel to this, the snippet index is searched using the new query and results in the snippet database 6 are returned. These results from the snippet database 6 are ranked above the results from the underlying search engine(s) in the final results list returned to the user.

Results in the response from the snippet database are ranked according to a similarity metric score based on the overlap of terms in the current query with the terms in index. A threshold t is used on this similarity score to limit which results are returned in the response from the snippet database 6. The effect is to constrain the returned results to those whose representation has a high similarity with the query.

As illustrated in FIG. 2, the results returned by the search engines 2 are merged by the meta search component 5 to provide merged results RM, which are outputted to the snippet engine 5. The snippet engine 5 merges the results RM with the ranked snippet database results RC to provide the user results.

In more detail, the adaptors 3 convert the search query qT to a format that is compatible with each search engine S1 to Sn, namely q1'T to qn'T. The adaptors for S1 to Sn also convert the search engine responses back to a common response format, i.e. from R'1 . . . R'n to R1 . . . Rn. The common response format for each search result contains information returned from the underlying search engine that includes the snippet for the result and the current query qT.

The merging of R1 . . . Rn into a single result list RM is achieved by scoring each result according to how high it appears in a result list ranking and according to how many result lists it appears in. Results with better than average ranking scores (those that appear high up in many result lists) are ranked highly in the merged result list RM. If a given result does not appear in the result list of some underlying search engine 2 then it is penalized with a poor score, that is calculated to be 1 plus the length of the result list from this search engine. In this way RM contains a list of all of the results returned by the combination of underlying search engines. These results are ranked in such a way as to give preference to results that are consistently ranked high by many of the underlying search engines.

The snippet engine 5 manages the snippet indexes to the database 6. They contain indexed representations of results previously selected by users which are based on the snippets for which those results were originally selected. In the embodiment shown in FIG. 1, there is a single snippet index Ic used for all users U from the community of users C. In another embodiment there may be multiple snippet indexes, each for a different community of users or for a different individual user or a combination of both. The snippet engine 5 queries the appropriate snippet index with qT depending on the source of the query qT, and retrieves a response RC.

The results represented in the snippet index Ic are retrieved for the query qT using standard information retrieval methods. The snippet index itself is an inverted document index, such that each result is indexed under the terms that occur in all the snippets for which it was selected in the past. Results are retrieved by comparing the terms in qT against the terms in the index, and retrieving those results whose representations contain at least one of the query terms. In one embodiment, only those results are retrieved that contain above a certain proportion of the terms in qT. In another embodiment, the retrieved results are scored according to a term frequency, inverse document frequency (TFIDF) weighted cosine similarity measure according to Equation 1, and this score is used to rank the results in the response RC.

$$Sim(r, p) = \frac{\sum_{i=1}^{t} r_i p_i}{\left(\sum_{i=1}^{t} (r_i)^2 \sum_{i=1}^{t} (p_i)^2\right)^{\frac{1}{2}}}$$

Equation 1

TFIDF Cosine Similarity Score. r and p are the TFIDF weighted term vectors of the result representation and the query qT respectively.

In a further embodiment, the results are scored using a combination of the TFIDF similarity score and the query similarity between qT and the queries for which the result was previously selected and the relative hits count for the result and previous queries for which it was selected according to Equations 2 and 3 to give a relevance score for the result.

$$Rel(r_j, q_i) = \frac{H_{ij}}{\sum_{\forall j} H_{ij}}$$

Equation 2

Relative Hits Count. rj is the result and qi is a query for which the result was previously selected. Hij is the number of times rj was selected for query qi.

$$\text{Relevance}(r_j, q_T, q_1, \ldots, q_n) =$$

$$TFIDF(r_j, q_T) * \left(1 + \sum_{i=1}^{n} \left(\begin{array}{c} Rel(r_j, q_i) \cdot \\ QuerySim(q_T, q_i) \end{array}\right)\right)$$

Equation 3

The relevance score for result rj with current query qT and queries q1 . . . qn for which rj was previously selected. TFIDF(rj, qT) refers to the TFIDF Cosine Similarity Score of rj and qT as in equation 1. QuerySim is some suitable query similarity metric for comparing two queries such as the Jaccard similarity metric.

The results from the snippet database 6 in the response RC may not have snippets associated with them that are biased to the current query qT, since these results may have been selected in the past for different queries. If a result was previously selected for queries q1 . . . qn, then the snippet that is returned for this result in RC is the snippet that was previously returned for the query q1 . . . qn which is most similar to qT.

A suitable query similarity metric is used. RC is then combined with the combined responses from the meta search component RM to produce RT which is returned to the user U.

The snippet engine 5 sorts the results RC returned from the snippet index Ic according to each result's similarity score which is calculated according to a suitable similarity metric between the terms in the query qT and the terms in the results representation in the snippet index. In one embodiment, this similarity metric is the term vector cosine similarity, where each result's term vector is weighted according to a term frequency, inverse document frequency weighting. RC is combined with RM to produce RT by ranking all results in RC above those in RM.

Figure 3:
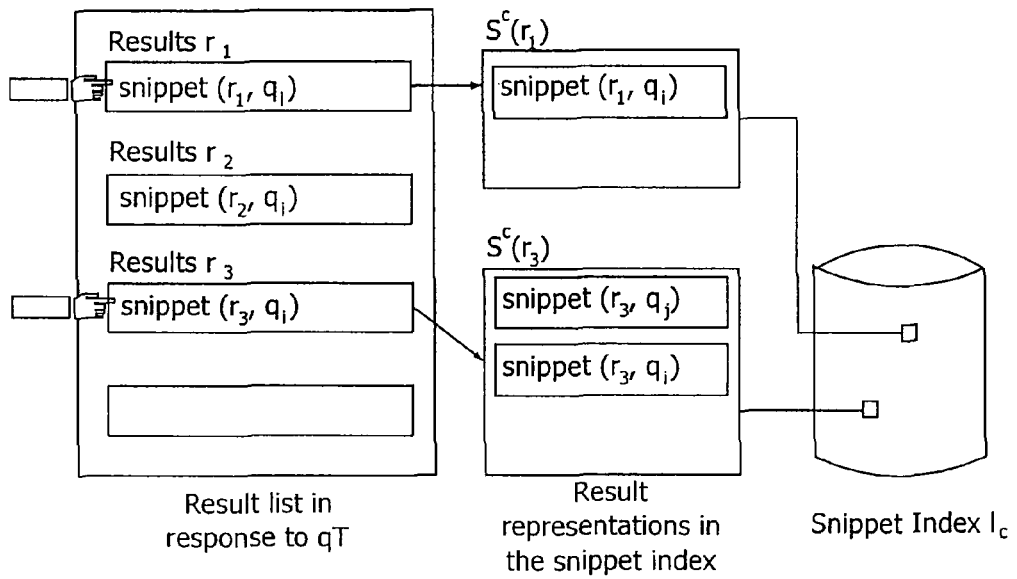
FIG. 3 is a flow diagram illustrating how the meta search engine updates a snippet index.

The snippet engine 1 also updates results in the snippet index as shown in FIG. 3. This shows a final result list for query qT with each result having its corresponding snippet as returned from the underlying search engine. Snippets are query biased and are generated by the underlying search engines 2 by extracting fragments from the content of results which are relevant to the terms of the search query qT. Thus in FIG. 3, Snippet(R1, QT) denotes the snippet for result R1 according to query qT as returned by the underlying search engine. In the example, R1 and R3 are selected by the user. R1 has never been selected previously and it does not have an existing representation in the snippet index so a representation is created in the snippet index for R1, Sc(R1) using Snippet(R1, QT). In another embodiment, the query qT itself is also added to this representation along with the snippet. R3 has been selected previously for another query qi and so it is already represented in the snippet index by Sc(R3) which contains Snippet(R3, qi), which was the snippet returned for the result in the previous search when the result was selected. Sc(R3) is updated by adding the current snippet Snippet(R3, qT) to the existing representation.

In a further embodiment, the snippet engine 5 produces summaries for promoted results, the summaries being based on the snippets for which the results were previously selected. The summaries are returned to the user and are displayed. These summaries are referred to as social summaries.

Figure 4:
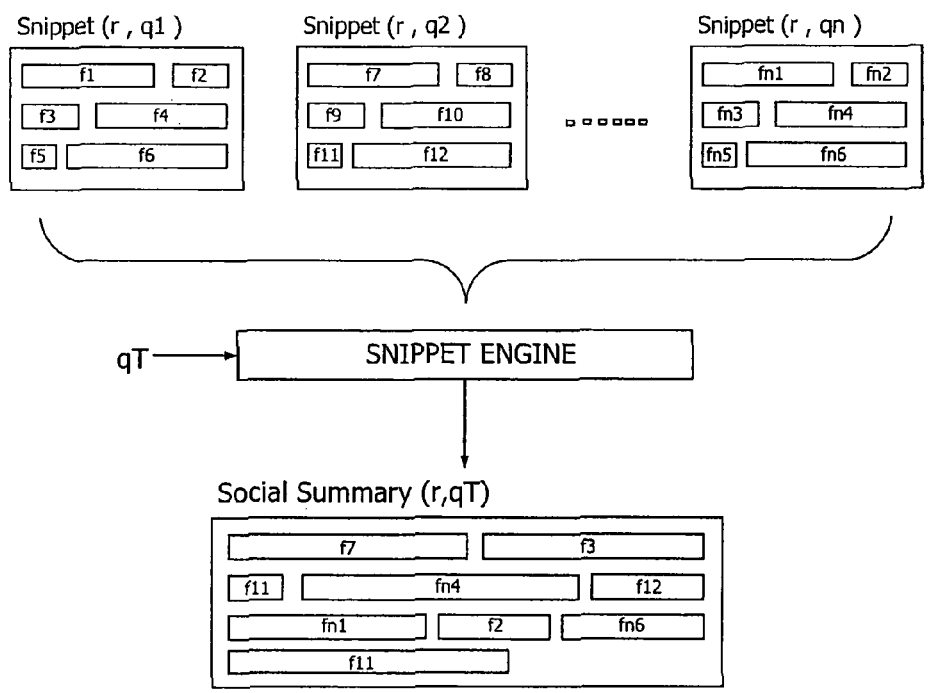
FIG. 4 is a flow diagram illustrating how the meta search engine generates a social summary.

In one embodiment, each result in the response RC returned from the snippet engine (see FIG. 1) is assigned the snippet from the set of snippets for which the result was previously selected whose associated query is most similar to the current query qT according to a suitable similarity metric. In a further embodiment, each result is assigned a social summary which is produced by merging portions from the set of snippets associated with the result and previous queries which led to its selection. p FIG. 4 shows the generation of a social summary by the snippet engine 5. The result r was previously selected for a number of queries q1 . . . qn, with each selection having associated snippets Snippet(r,q1) . . . Snippet(r,qn). These snippets were returned from the underlying search engines and are composed of fragments (f1 . . . fn) of the original result document content that are related to the original search query terms. The exact method of generation of the snippet is dependent on the underlying search engines, and the search engine adaptors shown in FIG. 1 extract the snippet fragments along with other result information as explained previously.

For result r and current query qT, the snippet engine 5 calculates a score for each unique fragment occurring in the snippets for previous selections of r, Snippet(r,q1) . . . Snippet (r,qn). In one embodiment this score is based on the similarity of previous queries to the current query qT for which r was selected and for which the associated snippet contains the fragment, combined with the relative hits count of those previous queries to the current query qT as in Equation 4. Thus if a particular fragment occurs in many of the snippets for the result and the queries related to those snippets are similar to the current query and the number of times the result was selected for that query in the past is high relative to the total number of times the results was previously selected, then the score is high.

$$\text{Score}(f, qT, r) = \sum_{i=0}^{n} \binom{\text{Contains}(\text{Snippet}(r, qi), f) *}{\text{Sim}(qT, qi) * \text{Rel}(r, qi)} \qquad \text{Equation 4}$$

The score for fragment f, for the current query qT and result r. q1 . . . qn are the queries for which r was selected in the past. Contains(snippet, fragment) is 1 iff snippet contains fragment, 0 otherwise. QuerySim is some suitable query similarity metric and Rel is relative hits count as in Equation 2.

The social summary for result r and query qT is generated by the snippet engine component by ordering the unique snippet fragments according to descending order of their scores according to equation 4 and limiting the social summary length according to some threshold. In one embodiment this threshold is a maximum number of snippet fragments. In another embodiment the threshold is a maximum number of characters, with the lowest scoring fragment being removed if the character threshold bisects the fragment.

The snippet engine component generates social summaries for all the results in the response RC returned from the snippet index and the social summaries are returned for the promoted results in the combined result list RT which is returned to the user.

EXAMPLE

The following section details an example search session to demonstrate the invention. In the example scenario, the invention is deployed within the computer network of a company that specialises in software development using the Java programming language. The network is configured such that Web search queries originating within the company are handled by the meta search engine 1, and the snippet engine 5 has a single snippet index for all search queries within the company.

An employee within the company issues a Web search query for the query "programming resources". According to the operation of the engine, in parallel to the query being dispatched to a number of underlying Web search engines by the meta-search engine, the snippet engine also searches the snippet database using the original search query. In our example, there happen to be no result documents in the snippet database indexed under either of the two query terms, "programming" and "resources", so no results are returned from the snippet database.

The results for the search query from the underlying Web search engines (the meta results) are merged by the meta-search engine 2 and since there are no results from the snippet database only the meta results are returned to the employee. The meta results contain a number of results for different Web pages relevant for programming resources for different programming languages including those shown below:

C programming.com—Your Resource for C and C++ Programming

Web site designed to help learning C or C++ . . . provides C and C++ programming resources . . . C libraries reference . . .

www.cprogramming.com

XProgramming.com—an Agile Software Development Resource

Extreme programming practices, discussion, and support . . . resources on extreme programming practice and . . . XP development methodology . . .

www.xprogramming.com

Linoleum: Linux Programming Resources

Free Programming Resources . . . Multimedia. The Linux CDROM interface•SDL: The Simple DirectMedia Library . . . Network Programming. Spencer's Socket Site . . .

linoleum.leapster.org

The Unix Programming Resources Page

Unix programming resources in four different formats . . . full HTML hypertext . . . download unix reference . . .

www.erlenstar.demon.co.uk/unix

Java Programming Resources—Java, Java, and More Java

Java programming resources: FAQs, tutorials, compiler and browser download sites . . . documentation, books lists, IDEs, etc . . . complete java reference with examples . . .

www.apl.jhu.edu/Classes/Notes/Hall/java

The employee is interested in the Java programming language since their company specializes in that language so the employee selects the $5^{th}$ result, which is related to Java. The snippet engine 5 now creates an entry in the snippet database for the selected result URL and indexes it under the terms in the result's snippet as returned in the meta results. These are the terms "java", "programming", "resources", "FAQs", "tutorials", "compiler", "browser", "download", "sites", "documentation", "books", "lists", "IDEs", "complete", "reference" and "examples". In this example, commonly occurring stop words such as "and", "etc" and "with" are removed. If a particular term occurs more than once in the snippet, then that term is weighted for the result URL in the snippet index so that the term has more importance when assigning a score for the relevance of the result URL for the search query.

A different company employee subsequently issues a Web search query for the query "programming tutorials". Again the query is handled by the engine 1 and the query is submitted to the underlying Web search engines by the meta-search component 2 and to the snippet database 6 by the snippet engine 5. In this instance, the result that was previously selected for the query "programming resources" is retrieved from the snippet database because it was indexed under both "programming" and "tutorials". The snippet engine 5 combines this previously selected result with the meta results for the current query by ranking the snippet database result above the meta results before returning the merged result list to the employee, as shown below. The employee has benefited from the previous search behaviour captured in the snippet index by having a result relevant to their query and to their area of interest, i.e. the Java programming language, ranked ahead of all other results.

Java Programming Resources—Java, Java, and more Java

Java programming resources: FAQs, tutorials, compiler and browser download sites . . . documentation, books lists, IDEs, etc . . . complete java reference with examples . . .

www.apl.jhu.edu/Classes/Notes/Hall/java

Programmingtutorials.com—Free Online Programming Tutorials

Collection of tutorials links for many programming languages.

www.programmingtutorials.com

Cprogramming.com—Programming Tutorials: C++ Made Easy and C Made . . .

Many C/C++ tutorials to help learn the language today. Also includes a graphics tutorial.

www.cprogramming.com/tutorial.html

C programming.com—Your Resource for C and C++ Programming

A website designed to help learning C or C++. Understandable C and C++ programming tutorials, compiler reviews, source code, tips and tricks.

www.cprogramming.com/

C Programming Tutorial

This tutorial features a series of lessons designed to teach the basics of C programming. cplus.about.com/library/blctut.htm C++ Programming Tutorial This tutorial features a series of lessons designed to teach C++ programming. Its thirty-five lessons comprehensively cover most of the basics of the . . .

cplus.about.com/library/blcplustut.htm

C++ Programming Language Tutorials

A bunch of PDF files for C++ Programming Language Course.

www.cs.wustl.edu/~schmidt/C++

Subsequent Web search queries issued within the company may return a previously selected result in the meta results, but the result may not be retrieved from the snippet index due to the search query containing different terms from those that the result is indexed under. An example query in our scenario is "sample code". The previously selected result is not indexed in the snippet database under either of these terms, however the underlying Web search engines return the result since it is relevant to the new query. If an employee selected the result in this case, then the terms that it is represented by in the snippet index are updated to include the terms for the new snippet, which are shown below. The result is now indexed in the snippet index under the original terms along with the terms that occur only in the new snippet which are "sample", "code", programs", "introduction", "language", "simple" and "program". Once again, if a particular term occurs more than once in the snippet or else occurs both in the current snippet and the terms that the result URL was previously indexed under then the term is weighted accordingly.

Java Programming Resources—Java, Java and more Java

Java sample code and example programs . . . an introduction to the java language . . . simple java program sample code . . .

www.apl.jhu.edu/Classes/Notes/Hall/java/

In this example, our previously selected result can now be retrieved from the snippet database by the snippet engine 5 for a wider range of query terms, since it is indexed by the terms of two different snippets. In this way, the snippet database will grow in the number of previously selected results which are selected and in the number of terms for which each previously selected result is indexed under as more searches are carried out by the company employees. Results in the snippet database 6 will be retrieved for an increasingly wide range of new and repeated search queries, providing results highly relevant to the context of the employees work and reducing the overall time spent searching for information.

A social summary may be generated for our previously selected result when it is returned by the snippet engine 5 for a new query. In the past the result was selected from the results returned by an underlying Web search engine for the queries "Java resources" and "sample code", and were accompanied by the snippets "Java programming resources: FAQs, tutorials, compiler and browser download sites . . . documentation, books lists, IDEs, etc . . . complete java reference with examples . . . " and "Java sample code and example programs . . . an introduction to the java language . . . simple java program sample code . . . " respectively. The fragments from these snippets are merged and re-ordered according to the method described above to produce a social summary to be returned with the result:

"Java programming resources: FAQs, tutorials, compiler and browser download sites . . . Java sample code and example programs . . . an introduction to the java language . . . documentation, books lists, IDEs, etc . . . simple java program sample code . . . complete java reference with examples"

The invention is not limited to the embodiments described but may be varied in construction and detail.

The invention claimed is:

1. An information retrieval method carried out by an information retrieval system including a meta search engine with a snippet engine having a database storing previously selected search results and a snippet index to the database, the snippet index having terms included in snippets of the selected search results when they were previously selected, a snippet being a query-based summary of a result document that is returned by an underlying search engine and containing extracts from the content of the result document related to the terms in the search query that produced the result document, wherein there are a plurality of snippet indices, and a particular snippet index is dynamically selected according to a community for the user; and at least one underlying search engine, the method comprising the steps of:
the meta search engine receiving a user information query in the form of key terms;
the meta search engine submitting the query to each underlying search engine;
submitting the user information query to the snippet engine;
the snippet engine retrieving results according to matching of the query terms with the snippet index;
the meta search engine receiving results from each underlying search engine; and
the meta search engine merging the underlying search engine results with the snippet engine results to provide output user results, and submitting the output user results to the user:
monitoring which results of the output user results are selected by the user, and updating the snippet database and snippet index accordingly;
indexing a selected result in the snippet index on the terms in the snippet returned by the underlying search engine; and
weighing repeat terms in a snippet as they are used to modify the snippet index.

2. The information retrieval method as claimed in claim 1, wherein the query is submitted to the snippet engine so that the snippet engine processes in parallel with the underlying search engine.

3. The information retrieval method as claimed in claim 1, wherein commonly occurring stop terms of a snippet are not used for the snippet index.

4. The information retrieval method as claimed in claim 1, wherein the snippet engine returns only results having a score greater than a threshold, the score indicating overlap of the query with snippet index terms.

5. The information retrieval method as claimed in claim 1, wherein the snippet engine ranks its results according to similarity of the query terms and the index terms.

6. The information retrieval method as claimed in claim 5, wherein the ranking is according to weighted term vectors.

7. The information retrieval method as claimed in claim 1, wherein the snippet engine assigns to each of its selected search results a selected snippet from the set of snippets for which the result was previously selected and whose associated query is most similar to the current submitted query.

8. The information retrieval method as claimed in claim 1, wherein the snippet index is an inverted document index.

9. The information retrieval method as claimed in claim 1, wherein the method comprises the further step of the snippet engine returning the results with a social summary derived from the snippets of the returned results.

10. The information retrieval method as claimed in claim 1, wherein the meta search engine submits the user information query to a plurality of search engines and merges results from the search engines and then merges the search engine merged results with the snippet engine results.

11. A meta search engine comprising:
means for receiving a user information query in the form of key terms;
means for submitting the query to at lest one search engine;
a snippet engine having a database storing previously selected results an a snippet index to the database, the snippet index having terms included in snippets of the selected search results when they were previously selected, a snippet being a query-based summary of a result document that is returned by an underlying search engine and containing extracts from the content of the result document related to the terms in the search query that produced the result document, wherein there are a plurality of snippet indices, and a particular snippet index is dynamically selected according to a community for the user;
means for submitting the query to the snippet engine;
the snippet engine being adapted to retrieve results according to matching of the query terms with the snippet index;
means for receiving results from each search engine; and
means for merging the search engine results with the snippet engine results to provide output user results, and for submitting the output user results to the user, and
wherein the meta search engine is adapted to monitor which results of the returned output user results are selected by the user, to update the snippet database and index accordingly, to index a selected result in the snippet index on the terms in the snippet returned by the search engine, and to weigh repeat terms in a snippet as they are used to modify the snippet index.

12. A computer readable storage medium comprising software code for implementing a method of claim 1 when executing on a digital computer.

13. An information retrieval method carried out by an information retrieval system including a meta search engine having a snippet engine having a database storing previously selected search results and a snippet index to the database, the snippet index having terms included in snippets of the selected search results when they were previously selected, a snippet being a query-based summary of a result document that is returned by an underlying search engine and containing extracts from the content of the result document related to the terms in the search query that produced the result document, wherein there are a plurality of snippet indices, and a particular snippet index is dynamically selected according to a community for the user; and at least one underlying search engine, the method comprising the steps of:
the meta search engine receiving a user information query in the form of key terms;
the meta search engine submitting the query to each search engine;
submitting the user information query to the snippet engine;

the snippet engine retrieving results according to matching of the query terms with the snippet index;

the meta search engine receiving results from each underlying search engine;

the meta search engine merging the underlying search engine results with the snippet engine results to provide output user results, and submitting the output user results to the user;

monitoring which results of the returned output user results are selected by the user, and updating the snippet database and index accordingly;

indexing a selected result in the snippet index on the terms in the snippet returned by the search engine;

weighing repeat terms in a snippet as they are used to modify the snippet index;

the snippet engine returning only results having a score greater than a threshold, the score indicating overlap of the query with snippet index terms;

the snippet engine ranking its results according to similarity of the query terms and the index terms;

the snippet engine assigning to each of its results a snippet from the set of snippets for which the result was previously selected and whose associated query is most similar to the current query; and the snippet engine returning the results with a social summary derived from the snippets of the returned results.

* * * * *